United States Patent

Wheatley

[11] Patent Number: 6,065,786
[45] Date of Patent: May 23, 2000

[54] VEHICLE BUMPER ASSEMBLY

[76] Inventor: Donald G. Wheatley, 4451 Ford Rd., Ann Arbor, Mich. 48105

[21] Appl. No.: 09/120,481

[22] Filed: Jul. 22, 1998

[51] Int. Cl.[7] ..................................................... B60R 19/22
[52] U.S. Cl. .............................. 293/109; 293/21; 293/125
[58] Field of Search ............................... 293/17, 20, 21, 293/48, 49, 120, 121, 125, 107, 109

[56] References Cited

U.S. PATENT DOCUMENTS

| 814,171 | 3/1906 | Simms | 293/107 |
|---|---|---|---|
| 1,727,982 | 9/1929 | Jacobs | 293/109 |
| 2,519,429 | 8/1950 | Brandvold | 293/48 |
| 3,499,661 | 3/1970 | Rowe, Jr. | 293/48 X |
| 5,265,925 | 11/1993 | Cox et al. | 293/120 |

FOREIGN PATENT DOCUMENTS 2711372  10/1978  Germany ................ 293/120

*Primary Examiner*—KD. Glenn Dayoan
*Assistant Examiner*—Patricia Engle
*Attorney, Agent, or Firm*—Chupa & Alberti, P.C.

[57] ABSTRACT

A vehicle bumper assembly 10 including a reinforcement beam member 12, a cover 20, energy absorbing foam 22 and a material 18 which has a relatively low coefficient of friction and which is disposed between member 12 and foam 22. Material 18 allows foam 22 and cover 20 to move longitudinally along member 12 during an "offset" collision, thereby reducing the likelihood of vehicle damage and passenger injury.

5 Claims, 5 Drawing Sheets

VEHICLE BUMPER ASSEMBLY

FIELD OF THE INVENTION

The present invention generally relates to a vehicle bumper assembly and, more particularly, to a bumper assembly for use on or in combination with an automotive vehicle and which is adapted to reduce the amount of damage to the vehicle especially in the event of an angular or "offset" collision and which is further adapted to especially protect the vehicle occupants in the event of such an angular or "offset" collision, thereby reducing the probability of bodily injury or harm in the event of such a crash or collision.

BACKGROUND OF THE INVENTION

One of the major drawbacks associated with many prior art vehicles and/or vehicle bumper assemblies arise from their respective inability to effectively and/or satisfactorily function and/or cooperate with the bumper support structure to dissipate energy generated in, or arising from an "offset" or angular collision. As used within this Application the term "bumper assembly" and "bumper system" means a bumper and its supporting structure.

This drawback is of a relatively high concern since such "offset" collisions are relatively common and the resulting structural deformation type "intrusion" into the passenger compartment can be severe. Particularly, such "offset" or angular type collisions occur when, for example, two vehicles angularly collide in a manner in which their respective longitudinal axis are "offset" or form an angle between zero degrees and one hundred and eighty degrees during or at the time of collision. Moreover, "offset" collisions also commonly occur when a vehicle impacts a stationary or fixed object such as a tree or an abutment at some angle with respect to the vehicle's longitudinal axis, between zero degrees and one hundred and eighty degrees, or if the impact "favors" (e.g. occurs) on only one side of the vehicle.

Conventional bumpers were originally designed to protect the vehicle during low speed collisions. Recently, safety concerns from consumers as well as new government regulations have mandated greater occupant safety which has required improved energy management that goes beyond that which is provided by the "basic" or "conventional" bumpers and/or bumper assemblies, which normally function to protect the vehicle from damage caused by low speed collisions.

The kinetic energy involved in a collision is directly proportional to the vehicle's mass multiplied by the square of the vehicle's speed. A bumper system and/or assembly which comprises at maximum about 10 inches of vehicle length can only absorb a collision in the 5 miles per hour range. However, such a bumper would be inadequate to absorb the energy generated in a 30 mile per hour collision which is about 36 times greater than that generated in a 5 mile per hour collision and which requires about 20 to 24 inches of crush to be fully absorbed.

A conventional bumper and/or bumper assembly typically absorbs the kinetic energy of a collision through deformation of a foam beam which is generally covered by a flexible polymer cover, or by the stroking of a shock absorber type device which is filled with a gel. At higher speeds, the energy involved in the collision increases, with the square of the velocity of the vehicle, and at speeds above 5 miles per hour, the vehicle bumper system is usually unable to absorb the added energy and the vehicle's frame structure, which supports the bumper, undergoes plastic deformation. It has been found that a closed tubular structure, generally rectangular for ease of manufacture, can be designed to collapse in a controlled manner. This tubular structure can be manipulated by pre-forming the tube to induce progressive buckling failure in a desired manner, or by changing physical characteristics of the tube such as tapering the tube, changing the wall thickness, or changing the numbers and/or types of corners (e.g. an octagonal tube). These alterations provide the desired force deflection characteristics for specific vehicles.

For example, the Volvo corporation has used a rectangular section bumper beam supported by rectangular frame beams to achieve a square wave deceleration pulse. In the Volvo design, the relatively strong bumper beam generally assures that the impact load is carried to the vehicle fore-aft beams for crash energy absorption. The energy absorbed by the vehicle's structure can be described as equal to the area under the vehicle's load versus deformation curve. It is desirable that a vehicle's fore-aft structure carry a high load over a long stroke to allow maximum energy dissipation. The higher the deceleration load, the less deformation will occur. The deceleration load must be balanced or injury may occur. If it is too high, the deceleration can result in a high deceleration force (measured in units referred to as "G's" or "g's" and having a value equal to the gravitational constant which is about 32 feet/sec$^2$) on the occupant's chest and head; if the deceleration is too low, the result is a larger deformation to the vehicle which results in greater crushing to the occupant compartment.

The tubular structure's energy absorption is generally tailored to meet U.S. Government mandated standards which specifies a perpendicular impact into a barrier. Unfortunately, during "real world" collisions, the vehicle's structure can be loaded "off axis" or at an angle. With off-center or angular loads, the vehicle's structure tends to be loaded on one side only, and the loads on this portion of the structure tend to be non-axial. With non-axial loading the tubular structure tends to buckle quickly thereby reducing the energy absorption capability of the column and increasing the amount of intrusion into the passenger compartment. The combination of loading only half of the vehicle's structure, along with this structural buckling, results in much higher intrusion into the passenger compartment than would occur in a full frontal collision.

Conventional vehicle bumpers and/or bumper assemblies are generally adapted to absorb and/or dissipate the force and/or energy that is generated when a vehicle collides with or is impacted by another vehicle or object, thereby protecting the vehicle and its passengers and/or the contents of the vehicle from damage or injury.

For example and without limitation, conventional or typical automotive vehicles generally include a first bumper assembly located or mounted in or on the front of the vehicle and a second substantially identical bumper assembly located or mounted in or on the rear of the vehicle.

More particularly, conventional or typical bumpers and/or bumper assemblies usually comprise a generally "C" shaped or closed section metal bumper reinforcement or mounting member having a generally flat planar surface which is normally deployed perpendicular to the longitudinal axis of symmetry of the vehicle and which is positioned such that its planar surface faces toward the exterior of the vehicle. The bumper member usually has or includes a channel portion, longitudinally coextensive to the flat planar surface, such channel portion being normally connected to at least two substantially identical reinforcement beam members, each having a generally rectangular tubular shaped cross section and positioned within or attached to the channel of the bumper on opposed end portions, while being substantially parallel to the longitudinal axis of symmetry of the vehicle. Typical bumpers or bumper assemblies also generally include a substantially hollow bumper cover which is generally overlaid with a flexible material, such as plastic, and which is formed and painted to suit the style and shape of the vehicle. Additionally, in many vehicles, the bumper cover is often filled with a deformable, impact absorbing, foam type material, such as and without limitation conventional and commercially available urethane. The bumper cover is adapted to removably mount to the bumper member and the bumper member and cover cooperate to maintain or keep the deformable foam in a fixed position in order to allow the foam to absorb low speed collision type energy, thereby protecting the structural integrity of the vehicle.

Some of these prior vehicle bumpers and bumper assemblies are described, for example and without limitation, in U.S. Pat. No. 4,968,076 of Kenji and 4,826,226 of Klie et al., which are each fully and completely incorporated herein by reference, word for word and paragraph for paragraph. Further, vehicle bumpers are generally known to those of skill in the art and are set forth, for example and without limitation, within U.S. Pat. No. 4,350,378 of Wakamatsu and within U.S. Pat. No. 4,968,076 of Kuroki, each of which is fully and completely incorporated herein by reference, word for word and paragraph for paragraph.

One of the major drawbacks associated with many of these prior art vehicle bumpers and/or vehicle bumper assemblies arise from their respective inability to effectively and/or satisfactorily absorb and transfer energy generated in or arising from an "offset" or angular collision. This drawback is of a relatively high concern since such "offset" collisions are relatively common and can result in intrusions into the passenger compartment. Particularly, such "offset" or angular type collisions arise when, for example, two vehicles angularly collide in a manner in which their respective longitudinal axes are "offset" or form an angle between zero degrees and one hundred and eighty degrees during or at the time of collision. Moreover, "offset" collisions also commonly occur when a vehicle impacts a stationary or fixed object such as a tree or an abutment at some angle with respect to the vehicle's longitudinal axis, between zero degrees and one hundred and eighty degrees, or if the impact "favors" (e.g. occurs) on only one side of the vehicle.

These "offset" impact type collisions are known to particularly cause a relatively great amount of vehicle damage since the impact energy of an "offset" collision is generally absorbed only by the portion of the vehicle structure actually involved in the impact and/or by the portion of the vehicle very near the point of impact. Hence, in an "offset" type collision, the colliding vehicles are often-times crushed or deformed to a greater extent on the side or portion of the vehicle nearest the point of impact. This deformation often involves or results in a relatively large amount of structural damage, especially to the passenger compartment, and/or a relatively high amount of injury to any passenger riding within the passenger compartment. Thus, the risk or probability of death or serious bodily injury is dramatically increased if a collision is "offset", especially if the collision involves multiple passengers located in different areas of the passenger compartment.

The Applicant has found that differing methods of testing for offset crashes result in significantly different intrusion and deceleration. The U.S. government, in attempt to promote safer vehicles, has promulgated a test procedure covered by FMVSS208 (Federal Motor Vehicle Safety Standard). This procedure requires "full frontal" and "offset crash" testing both to be conducted at 30 miles per hour. These test procedures measure, through the use of crash dummies, occupant injury criterion including head injury criteria (HIC), chest "G's" and femur loads. To meet the regulations for a full frontal crash generally requires a front structure which crushes at approximately 20 G's. To achieve this 20 G's it is desirable for the structure of each side of the vehicle to have a controlled and dynamic collapse. A vehicle weighing 4000 pounds would require a dynamic crash force of approximately 20 times its weight, or about 80,000 pounds. This crush force would be split between the two sides evenly as 40,000 crush force per side of one vehicle. A uniform crush force, or a square wave pulse, results in a vehicle crush of about 20 to 25 inches during a frontal collision. If the front structure buckles, it loses the ability to carry a load and the crush distance becomes longer, potentially resulting in a greater intrusion into the passenger compartment. A front structure which comprises a "generally rectangular" closed section achieves a square wave pulse when collapsed axially. During an offset collision, this section is side loaded which causes the structure to buckle in bending resulting in greatly reduced energy absorption and an increased intrusion into the passenger compartment.

A typical FMVSS 208 offset crash is conducted by rotating the barrier face by a 30 degree angle or 60 degrees to the axis of the vehicle which is towed into the barrier. During the FMVSS 208 barrier crash the vehicle slides along the low friction barrier face and this results both in a lowered G force and in a reduced intrusion into the occupant compartment. The FMVSS 208 offset test has been criticized as inaccurately simulating "real world" offset collisions where the vehicles stick together and do not slide; in actual collisions the intrusion into the vehicle is greater. In France, offset tests similar to the U.S. FMVSS 208 are conducted, but with vertical strips on the barrier, causing the vehicle to stick to the barrier. This "sticky barrier" reduces sliding and results in both higher G loading and larger intrusions into the occupant compartment. The French contend that this test protocol better matches "real world" collisions where vehicles become enmeshed and do not slide. The Germans have conducted tests where vehicles impact a flat wall with only a portion of the vehicle actually contacting the wall. They contend that this test protocol better represents the majority of crashes which occur in the "real world." With the German test method as well as the French, the vehicle does not slide, but sticks to the target, and the support structure on the side of the impact absorbs the crash. When the vehicle does not slide, the crash is mainly absorbed by half of the vehicle structure. The offset force components load the structure, which tends to buckle, resulting in increased intrusion into the passenger compartment on the crashed side of the vehicle.

Based on these tests the Applicant has found that vehicles involved in "real world" "offset" type collisions would incur substantially less damage, substantially less deformation, and substantially less intrusion into the occupant compartment if they were equipped with a bumper assembly which was adapted to "slide" or move laterally with respect to, or in reference to, the collision object.

A sliding bumper system would reduce the rate of velocity change by: (1) deflecting the vehicle path to partly miss the object, and (2) assuring that the energy of the collision causes primarily axial loading which results in an axial collapse of the support structure. An axially loaded tubular structure will collapse in an efficient square force versus deflection wave, thus absorbing the maximum energy to further minimize the intrusion. A sliding bumper lowers the overall energy by deflecting the vehicle and loads the structure efficiently, thus greatly maximizing potential intrusion into the passenger compartment.

The Applicant has found that vehicles involved in "offset" type collisions incur substantially less damage and substantially less deformation when they have bumper assemblies which are adapted to "slide" or move laterally with respect to or in reference to the object with which they are colliding. The Applicant has further found that this "sliding action" allows a significant portion of the impact energy to be absorbed and/or dissipated and reduces the amount of crushing and/or structural damage to the vehicle structure. The Applicant has also found that such a reduction in the structural damage and such enhanced energy absorption also reduces the probability of occupant injury since such enhanced energy absorption reduces the amount of the force applied to the the amount of the force applied to the vehicle occupants due to sudden vehicle deceleration (e.g. often referred to as "deceleration force" or "g force") caused by a collision, and further reduces the probability of injury sustained due to the structural deformity of the passenger compartment.

The Applicant has found that in an "offset" collision, conventional vehicle bumpers and bumpers assemblies are unable to efficiently transfer impact type energy to portions of the vehicle outside of the immediate point of impact, or substantially deflect impact energy away from the vehicle and from the passenger compartment of the vehicle. This deficiency is at least in part due to the fact that the primary elements of many of these prior conventional vehicle bumper assemblies (e.g. the bumper reinforcement beam member, the bumper cover, and the underlying foam), while generally flexible and/or deformable, are rigidly interconnected and are not usually moveable with respect to each other or with respect to the vehicle. The rigid interconnection of the various previously delineated elements of these conventional bumper assemblies tends to limit the amount of "sliding action" which the vehicle experiences in an "offset" collision, thereby increasing the amount of deformation and "g-force loading" applied to the passengers.

There is therefore a need for a vehicle bumper and/or a vehicle bumper assembly which overcomes the various drawbacks of the prior art, such as and without limitation those which have been previously delineated; which provides enhanced energy absorption and dissipation characteristics; which provides enhanced passenger protection; and which substantially permits at least some of the components of the bumper assembly, made in accordance with the teachings of the preferred embodiment of the invention, to be deployed in a selectively moveable and slideable relationship, thereby greatly decreasing the amount of structural deformation and deceleration type force loading applied to the vehicle and its passengers when the vehicle is involved in an "offset" type collision. Applicant's invention addresses and overcomes some or all of these drawbacks associated with these prior vehicle bumpers and bumpers assemblies and provides a new and useful vehicle bumper assembly having improved impact energy absorption and "offset" crash characteristics.

SUMMARY OF THE INVENTION

It is therefore a primary object of the invention to provide a vehicle bumper assembly which overcomes some or all of the previously delineated disadvantages of prior vehicle bumpers and bumper assemblies.

It is another object of the invention to provide a vehicle bumper assembly which overcomes the previously delineated disadvantages of the prior art and which substantially permits the components of the bumper assembly to be deployed in a fixed but selectively moveable and/or slideable relationship.

It is another object of the invention to provide a vehicle bumper assembly which overcomes the previously delineated disadvantages of prior vehicle bumpers and bumper assemblies and which is further characterized by its ability to dissipate collision generated energy in a manner which reduces or minimizes the amount of vehicle structural deformation and deceleration type force loading applied to the vehicle and its passengers, thereby reducing the probability of passenger injury.

According to one aspect of the present invention a bumper assembly for use in combination with a vehicle is provided. In a first embodiment of the invention, the bumper assembly comprises a reinforcement beam; at least one armature member connecting the reinforcement beam to the frame of the vehicle; a layer of energy absorbing foam; a flexible bumper cover; and a certain amount of material having a relatively low coefficient of friction, the certain amount of material residing between the impact absorbing foam and the reinforcement beam and being effective to allow the foam and the flexible bumper cover to each selectively move longitudinally along the reinforcement beam when the vehicle is involved in an "offset" collision.

According to a second aspect of the present invention, a bumper assembly for use in combination with a vehicle is provided. According to this second aspect, a bumper assembly is provided comprising a reinforcement beam, at least one armature connecting the reinforcement beam to the frame of the vehicle, and a certain amount of material having a relatively low coefficient of friction, the certain amount of material residing between the bumper face and the reinforcement beam and being effective to allow the bumper cover to move longitudinally along the reinforcement beam when the vehicle is involved in an "offset" collision. The front face of the bumper and the bumper beam are connected by shearable tabs potentially molded into the bumper front face. The tabs are designated to shear at a total bumper side load above a predetermined level (e.g. 1,000 pounds).

According, to third aspect of the present invention, a bumper assembly is provided which is adapted for use on a vehicle having a frame. The assembly includes a bumper cover adapted to be attached to the vehicle frame and a plurality of roller members which are moveably deployed between the bumper beam and the bumper cover, and which are adapted to allow the bumper cover to move substantially perpendicular to the longitudinal axis of said vehicle when the vehicle collides with an object.

According to a fourth aspect of the present invention, a bumper assembly is provided which is adapted for use on a vehicle having a frame. The assembly includes a bumper cover adapted to be attached to the vehicle frame and a plurality of axial members which are deployed between the bumper beam and the bumper cover, and which are adapted to deform by bending at sides loads, lower than the load required to buckle the main vehicle structure, to allow the bumper cover to move substantially perpendicular to the longitudinal axis of said vehicle when the vehicle collides with an object.

Further objects, features, and advantages of the present invention will become apparent from a consideration of the following description and claims, when taken in conjunction with the accompanying drawings.

BRIEF DESCRIPTION OF THE DRAWINGS

For a substantially full and more complete understanding of the nature and objects of the present invention, reference should be had to the following drawings in which.

DETAILED DESCRIPTION OF THE PREFERRED EMBODIMENT OF THE INVENTION

Figure 1:
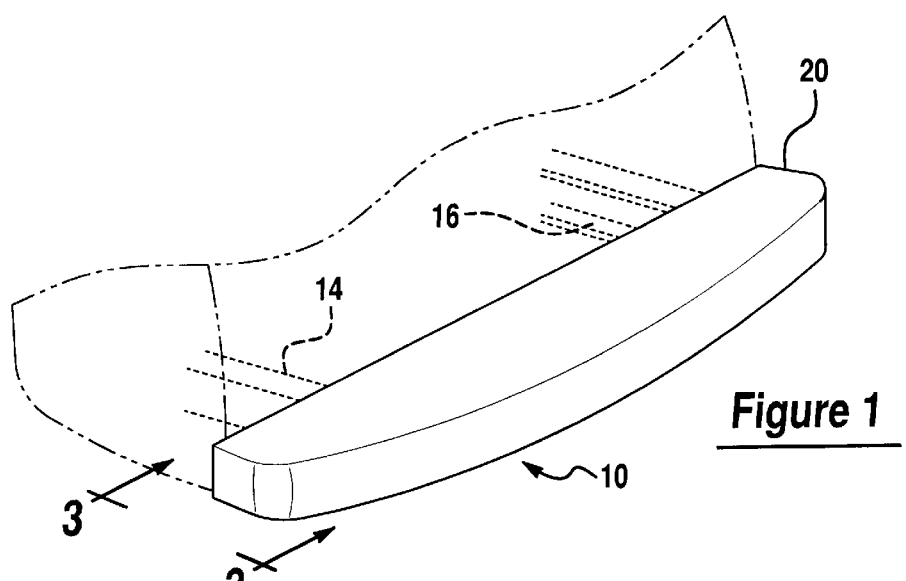
FIG. 1 is a front perspective partial cut-away assembled view of a vehicle bumper assembly made in accordance with the teachings of the preferred embodiment of the invention.
Figure 2:
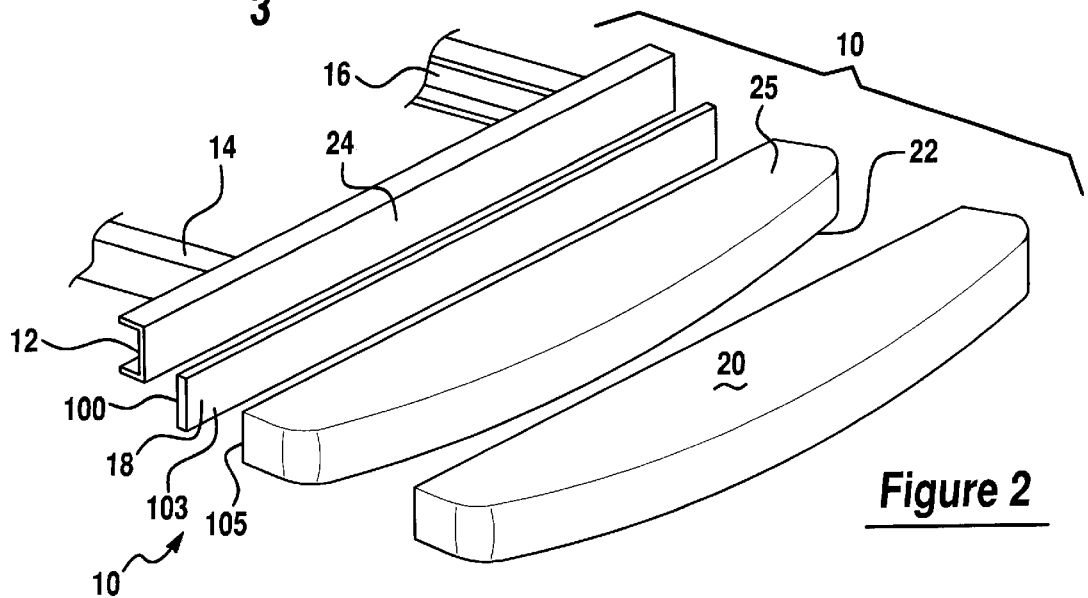
FIG. 2 is a front perspective unassembled view of a vehicle bumper assembly made in accordance with the teachings of the preferred embodiment of the present invention and shown, for example, in FIG. 1.
Figure 3:
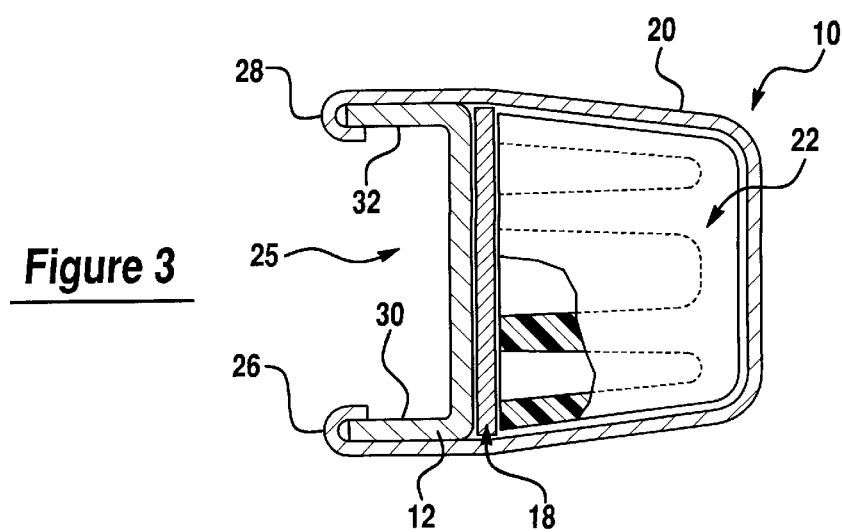
FIG. 3 is a side cut-away view taken along view line 3—3, as shown in FIG. 1 of the vehicle bumper assembly made in accordance with the teachings of the preferred embodiment of the invention.
Figure 4:
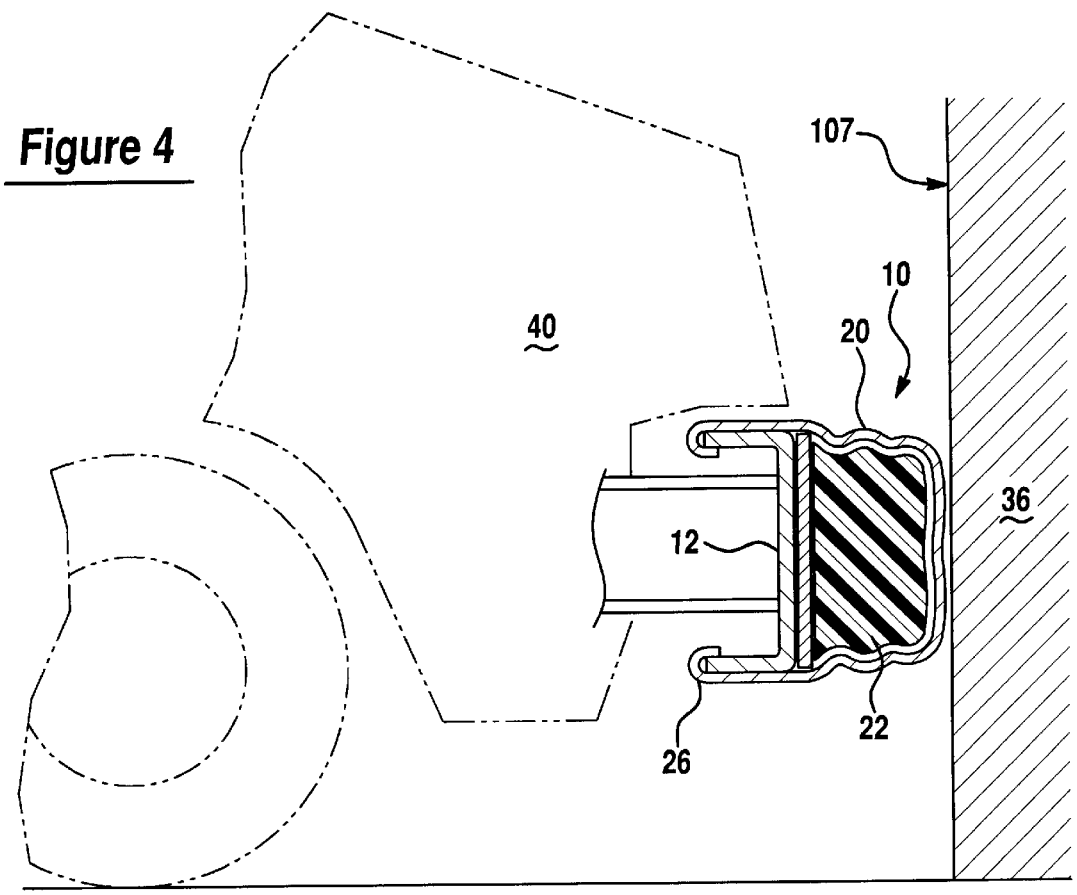
FIG. 4 is a side cut away view of a vehicle bumper assembly made in accordance with the teachings of the preferred embodiment of the invention and deployed upon a vehicle which has been involved in a direct or "head-on" collision.
Figure 5:
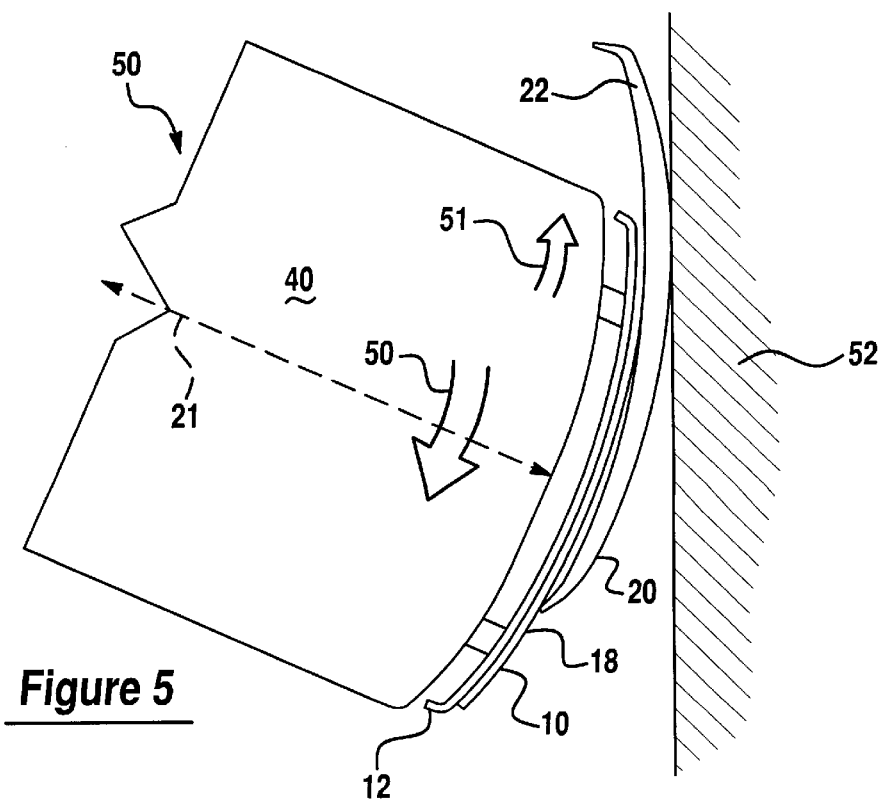
FIG. 5 is a top view of vehicle bumper assembly made in accordance with the teachings of the preferred embodiment of the invention and deployed upon a vehicle which has been involved in an "offset" collision.

Referring now to FIG. 1, there is shown a vehicle bumper assembly 10 made in accordance with the teachings of the preferred embodiment of the invention and adapted for use upon the front or the rear of a conventional or typical vehicle, such as vehicle 40 shown in FIGS. 4 and 5. As shown in FIGS. 1–3, vehicle bumper assembly 10 includes a conventional, commercially available, and/or typical reinforcement bumper beam member 12 having a generally "C" shaped cross sectional area and a generally flat face portion 24 which forms a generally flat planar surface which is substantially perpendicularly positioned relative to the longitudinal axis 21 of vehicle 40 and which faces outward from vehicle 40. Further, bumper beam reinforcement member 12 includes or forms a generally rectangular tube shaped channel 25 which is longitudinally coextensive to surface 24 and which receives armature members 14 and 16. As should be appreciated to those ordinary skill in the art, beam 12 is normally an integral part of the structural framework of typical vehicle 40, as are armature beam members 14 and 16 which position surface 24 away from the vehicle 40 in the manner shown. Alternatively, member 12 may be affixed to members 14 and 16 by conventional means (e.g. by rivets or welding). Bumper assembly 10 further includes a cover 20, energy absorbing foam 22, and material 18 which will be more fully explained later. Further, as should be appreciated by those of ordinary skill in the art, while FIG. 1–3 depict the placement of beam member 12 and armature beam members 14 and 16 at the front of vehicle 40, Applicant's invention is equally applicable to the beam and armature members which are respectively and substantially similar to beam 12 and members 14 and 16 and which are usually positioned at the rear of the vehicle 40. Hence, typical and conventional vehicle 40 normally includes two substantially identical bumper assemblies which are positioned at each opposed end of the vehicle, each of which may be adapted to employ the various inventions set forth in this patent application. Hence, while the following discussion centers upon a bumper assembly used or deployed upon the front if a typical vehicle (e.g. the portion where the typical engine is located) it should be realized that it also describes a bumper assembly used on the rear of the typical vehicle (e.g. the portion where the typical trunk is located)

In the preferred embodiment of the invention, bumper reinforcement beam 12 is made from a strong and relatively rigid material, such as and without limitation steel, or any other suitable conventional and commercially available metal or composite material. In the preferred embodiment of the invention, material 18 comprises a generally flat strip of one or several layers of material having a relatively low coefficient of friction; having a thickness of about ⅛ inch to about ½ inch; and adapted to cover the entire surface 24 while normally abutting surface 24 and residing between reinforcement beam 12 and energy absorbing foam 22. In a first embodiment of the invention material 18 may comprise a back surface 100 which abuts face 24 and which is comprised of polytetrafluoroethylene or a chemical material selected from the family of amorphous copolymers of perfluoro (2,2-dimethyl- 1,3 dioxide) (PDD) and tetrafluoroethylene, such as those commercially available from the Dupont Company of Wilmington, Del. and referred to as Teflon® or TeflonAF®, and a front surface 103 comprised of commercially available rubber. The Teflon® or TeflonAF® may be deposited on the rubber from surface 103 by known techniques. Alternatively, the entire material 18 may comprise Teflon®, TeflonAF®, UHMW (ultra high molecular weigh) polyethylene or polypropylene. Moreover, in the preferred embodiment of the invention, material 18 is not normally attached to either surface 24 or foam 22. Importantly however, in another embodiment of the invention, material 18 may also comprise a coating of material having a low coefficient of friction (such as commercially available motor oil, such 10W30 grade oil made by Quaker State). Such a material may be placed on surface 105 of energy absorbing foam 22 which is in an abutting relationship to front surface 24 of reinforcement beam 12. In one embodiment of the invention, the oil is substantially and uniformly applied to a thicknesses of about ⅙ inch to about ½ inch. Other thickness are acceptable. Additionally, material 18 may be manufactured from any suitable material having a relatively low coefficient of friction, and which also has a resistance to tearing and penetration.

In the preferred embodiment of the invention, bumper cover 20 is manufactured from a flexible and resilient material such as, and without limitation, polyurethane, or any other suitable plastic, synthetic resin or other suitable conventional and commercially available flexible and resilient material. In the preferred embodiment of the invention, bumper cover 20 is painted and styled to match the shape, design and color of the vehicle 40. As shown, a layer of energy absorbing foam 22 substantially fills the hollow interior of bumper cover 20 and resides between bumper cover 20 and material 18 and adapted to the shape of cover 20. Particularly, the energy absorbing foam 22 is manufactured in a conventional manner from a deformable material such as but not limited to, foamed urethane or any other conventional and commercially available deformable material. Energy absorbing foam 22 may be molded and inserted into bumper covering 20 before being secured to reinforcement beam 12. The usefulness of material 18 and Applicant's bumper assembly 10 will now become apparent from a consideration of the following description.

Referring now to FIGS. 2 and 3, when the vehicle bumper assembly of the preferred embodiment of the invention is assembled upon vehicle 40, bumper cover 20 substantially encases and conceals reinforcement bumper beam member 12, material 18, and energy absorbing foam 22, thereby protecting these items from the damaging effects of moisture and/or other types of inclement weather or environmental damage, while providing a generally aesthetically pleasing overall appearance to the vehicle 40. As shown best in FIG. 2, material 18 resides, in the preferred embodiment of the invention, immediately between planar surface 24 of beam 12 and surface 105 of foam 22. Bumper cover 20 is adapted to and is manufactured to fit relatively snugly around and attach to reinforcement beam 12 without the use of conventional fastening devices (e.g. screws, and/or rivets). In the preferred embodiment of the invention, resilient lip portions 26 and 28 of bumper cover 20 respectively and removably attach to opposed edges 30 and 32 of beam member 12 which are longitudinally co-extensive with face portion 24 of reinforcement beam 12, thereby selectively and removably fastening bumper cover 20 to reinforcement beam 12. It should be understood that the present invention is not limited to this exact construction or method of fastening bumper cover 20 to reinforcement beam 12, but that various other designs and methods for fastening can be employed without departing from the spirit and scope of the invention. The advantages of Applicant's invention will now be readily realized.

Referring now to FIG. 4, there is shown vehicle bumper assembly 10 deployed on a vehicle 40 which has been involved in a direct or "head-on" collision with a stationary object 36, such as a wall. As shown best in FIG. 4, vehicle bumper assembly 10 made in accordance with the teachings of the invention, functions substantially similar to a conventional bumper assembly when vehicle 40 is involved in a "direct" or "head-on" collision, (i.e. a collision which is not "offset").

That is, upon impact in a "direct" type collision, bumper cover 20 flexes and allows the underlying foam 22 to crush. The crushed foam 22 thus both absorbs and distributes the collision generated energy to the underlying reinforcement beam 12. Since the impact occurs such as that the vehicle's longitudinal axis 21, shown in FIG. 5, is substantially perpendicular to the plane 107 formed by object 36, there is little or no component of the collision force or energy that lies substantially parallel to surface 24. As such, substantially no "sliding action" occurs between reinforcement beam 12, foam 22 and bumper covering 20. Hence, while material 18 provides little improvement over the conventional bumper assemblies in a "direct" type impact, it provides no degradation in performance. The vast improvement in "offset" type collisions is shown below.

Referring now to FIG. 5, there is shown a top view of vehicle 40 involved in an "offset" or angular type collision with a stationary object 52. In this "offset" type collision, the bumper cover 20 and energy absorbing foam 22 respectively flex and deform as previously explained, thereby absorbing some of the impact or collision generated energy. Importantly, in this "offset" type collision, the force of impact includes a component of force parallel to the surfaces 100, 103 of material 18 and to surface 24. Thus, after the initial flexing and deformation of bumper cover 20 and foam 22, the component of force parallel to surfaces 100, 103, and 24 causes bumper cover 20 and foam 22 to slide or move longitudinally along or parallel to surfaces 100, 103, and 24 (e.g. longitudinally coextensively to these surfaces 100, 103, and 24). Additionally, the resilience of bumper cover 20 allows it to "flex", "peel off", and/or become removed from reinforcement beam 12 and to slide laterally or longitudinal coextensively to surfaces 100, 103, and 24. This "sliding" reduces the amount of collision energy absorbed by the vehicle's structure and substantially prevents vehicle 40 from coming to an immediate stop. Importantly, this "sliding" occurs because material 18, having a relatively low coefficient of friction enhances the ability of foam 22 and cover 20 to move and, in fact, allows foam 22, cover 20, and beam 12 to be assembled in a fixed but slideable relationship.

That is, in this "offset" type collision, vehicle 40 slides in the direction indicated by arrow 50, as bumper cover 20 and foam 22 slide laterally (e.g. longitudinally coextensively relative to surfaces 100, 103, and 24,) in the direction of arrow 51. This sliding action of vehicle 40 and the components of assembly 10 allow vehicle 40 to decelerate at a lesser rate than it would have done without the bumper assembly 10, thereby minimizing the amount of "deceleration loading" to vehicle 40 and its passengers while reducing the overall amount of vehicle deformation relative to that which would otherwise have occurred if vehicle 40 had otherwise utilized conventional bumpers of the prior art. The use of material 18 therefore enhances the amount of collision type energy which is absorbed/dissipated, thereby reducing vehicle structural damage and reducing the probability of passenger injury by allowing the various component of assembly 10 to be assembled in a moveable relationship. The sliding action minimizing the bending loading on beam 16 in FIG. 2 and assures that the loading is axial. Axial loading assures a higher energy absorption and minimizes the amount of crush required to absorb the collision energy.

Figure 6:
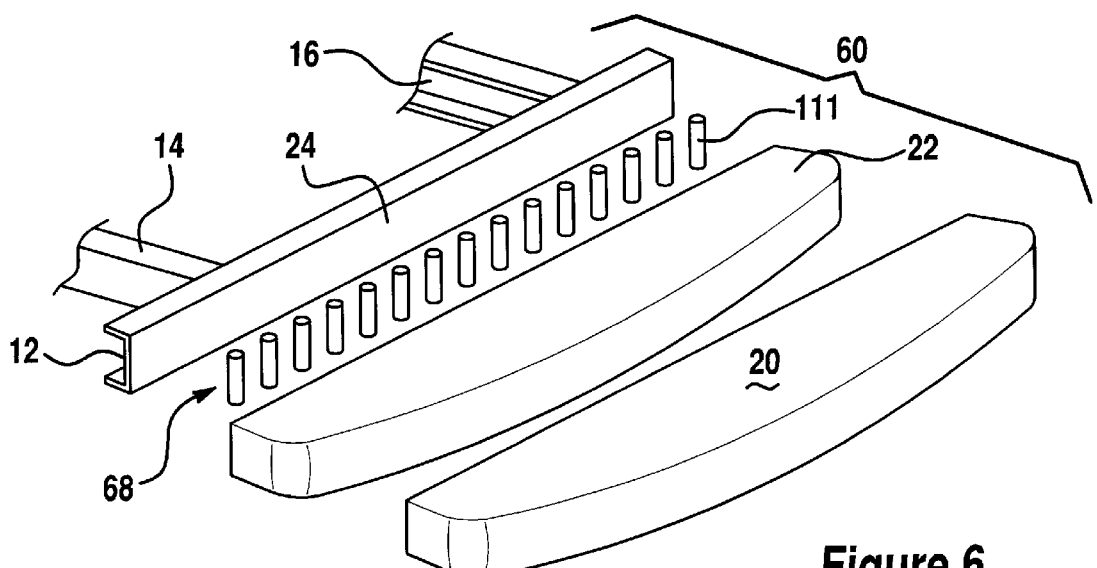
FIG. 6 is a front perspective unassembled view of a vehicle bumper assembly made in accordance with the teachings of a second embodiment of the present invention.
Figure 7:
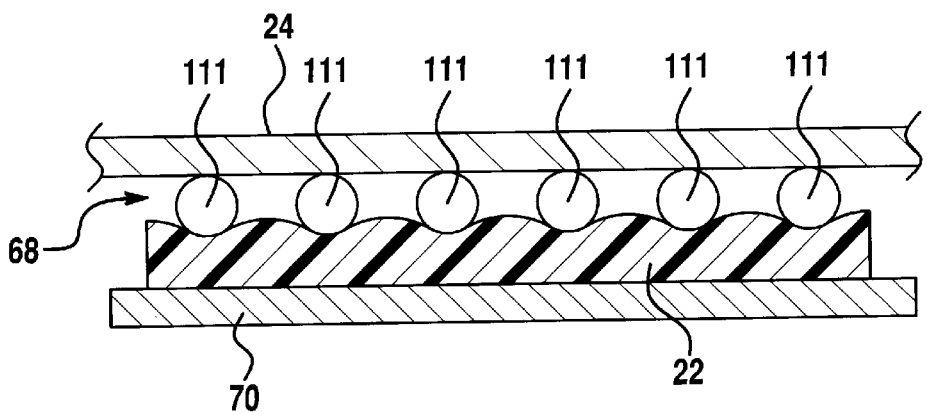
FIG. 7 is a top cut-away assembled view of the vehicle bumper assembly made in accordance of the teachings of a second embodiment of the present invention.

Referring now to FIGS. 6 and 7, there is shown a vehicle bumper assembly 60 made in accordance with the teachings of a second embodiment of the invention. The components of vehicle bumper 60 shown in FIG. 5 are substantially similar to those of vehicle bumper 10, wherein like reference numerals denote similar components.

In this alternate vehicle bumper assembly embodiment, surface 18 has been replaced with rolling member assembly 68 comprising a plurality of rolling members 111. Particularly, the plurality of rolling members 111 can comprise any number of devices capable of rolling smoothly and laterally across surface 24 of reinforcement beam 12. Rolling members 111 may comprise, for example and without limitation, a plurality of conventional and commercially available needle bearings, ball bearings, rolling rods, etc. In one embodiment of the invention each of the rolling members 111 are substantially similar and have a circular cross sectional area; have a height of about four inches to about seven inches; and a diameter of about three inches. Of course other dimensions are acceptable. Applicant has found that about seven such rolling members 111 are needed to allow bumper assembly 60 to achieve the desired objectives within a conventional sized American car weighing about 3,500 pounds.

In an "offset" type collision, the component of force parallel to surface 24 causes bumper cover 20 and foam 22 to slide longitudinally along surface 24 and further allows bumper cover 20 it to flex and "peel off" of reinforcement beam 12 as it slides longitudinally coextensively along or parallel to surface 24. This lateral or longitudinal "sliding action" prevents the vehicle 40, on which bumper assembly 60 is employed, from coming to an immediate stop, thereby minimizing the amount of "deceleration loading" type forces applied to the vehicle and its passengers, decreasing the amount of vehicle deformation in comparison to the conventional bumpers of the prior art, and greatly enhancing the amount of collision energy which is absorbed. Hence, Applicant has invented a new and useful bumper assembly which protects the structural integrity of the vehicle and its passengers in a manner superior to prior bumper assemblies which do not allow the bumper cover 20 or foam 22 to be assembled in a fixed but slideable or moveable relationship and to allow the cover 20 and foam 22 to move in the manner previously described during an offset collision.

Figure 8:
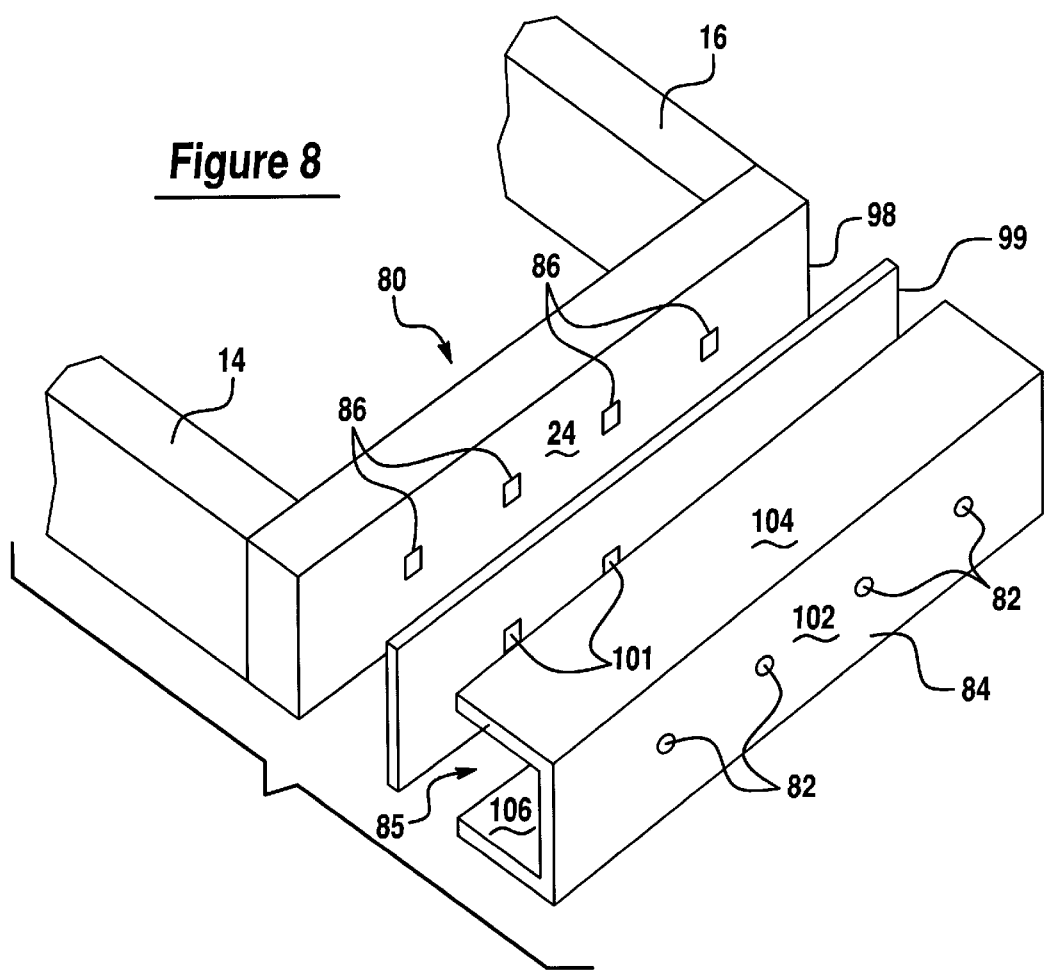
FIG. 8 is a front perspective unassembled view of a vehicle bumper made in accordance with the teachings of a third embodiment of the present invention.
Figure 9:
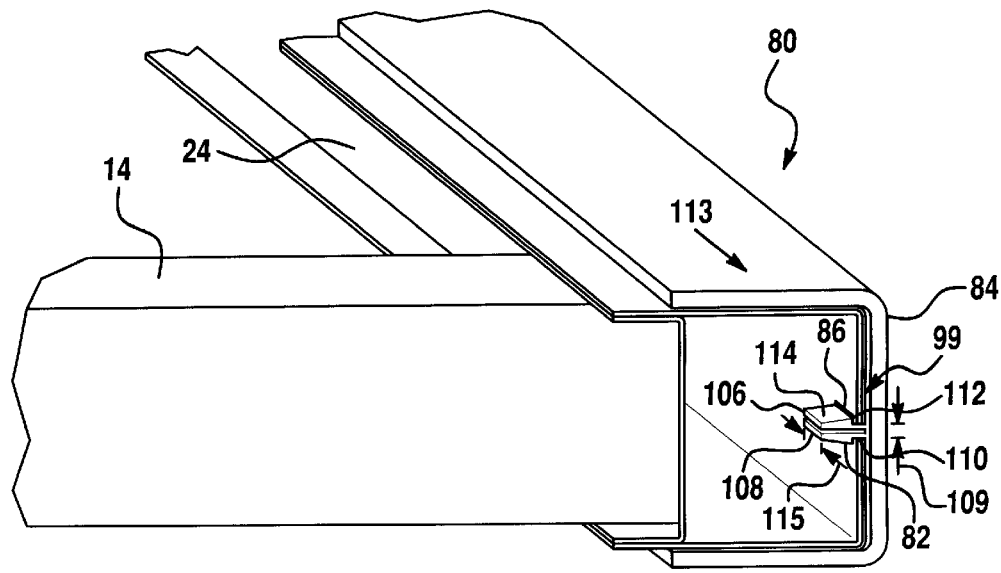
FIG. 9 is a side perspective partial cut-away assembled view of a vehicle bumper made in accordance with the teachings of a third embodiment of the present invention.

Referring to FIG. 8 and 9, there is shown a vehicle bumper assembly 80 made in accordance with the teachings of a third embodiment of the invention. The components of vehicle bumper assembly 80 shown in FIG. 8 are substantially similar in structure and function to those of bumper 10, wherein like reference numerals denote substantially similar components.

Particularly, assembly 80 includes a generally tubular rectangular shaped bumper reinforcement beam 98 which may be substantially similar to beam 12 with the exception of generally rectangular and substantially identical openings 86 disposed upon surface 24. It should be apparent to those of ordinary skill in the art that other shapes and/or sizes of openings 86 may be utilized. In one embodiment of the invention openings 86 are square with a diameter of about three inches. Further, material 99 is substantially similar to material 18 with the exception of generally rectangular and substantially identical openings 101 which are disposed upon the surface of material 99 and which are each adapted to selectively overlay a unique one of openings 86 when material 99 is assembled onto beam 98.

Further, as shown, bumper cover 84 having a generally "C" shaped cross section, has a front planner surface 102 and opposed planar edge surfaces 104, 106. Surface 102, 104, and 106 form a channel 85 which is adapted to selectively fix material 99 to front surface 24. Particularly, cover 84 includes a plurality of tab members 82, each of which is adapted, as best shown in FIG. 9, to penetrate a unique one of the corresponding openings pairs 86 and 101. In one embodiment each tab 82 includes substantially similar top and bottom portions 106, 108 which project into channel 25 and form a right angle with surface 102. Each portion 106 and 108 includes a stem portion 110 which attaches the respective portions 106, 108 within channel 85 in a manner which is substantially perpendicular to surface 102. Each portion 106, 108 further includes a shoulder portion 112 and a locking portion 114. In one embodiment, the stem portions 110 have a height 109 of about three inches and width 115 of about three inches.

As should be realized by those of ordinary skill in the art, each tab 82 is manufactured from a conventional and commercially available resilient material which allows portions 106 and 108 to be selectively compressed when each tab 82 penetrates the corresponding openings 86, 101 and later allow portions 106 and 108 to expand in a manner which cooperates with shoulders 112 to prevent the tab 82 from exiting the openings 101, 86.

Figure 10:
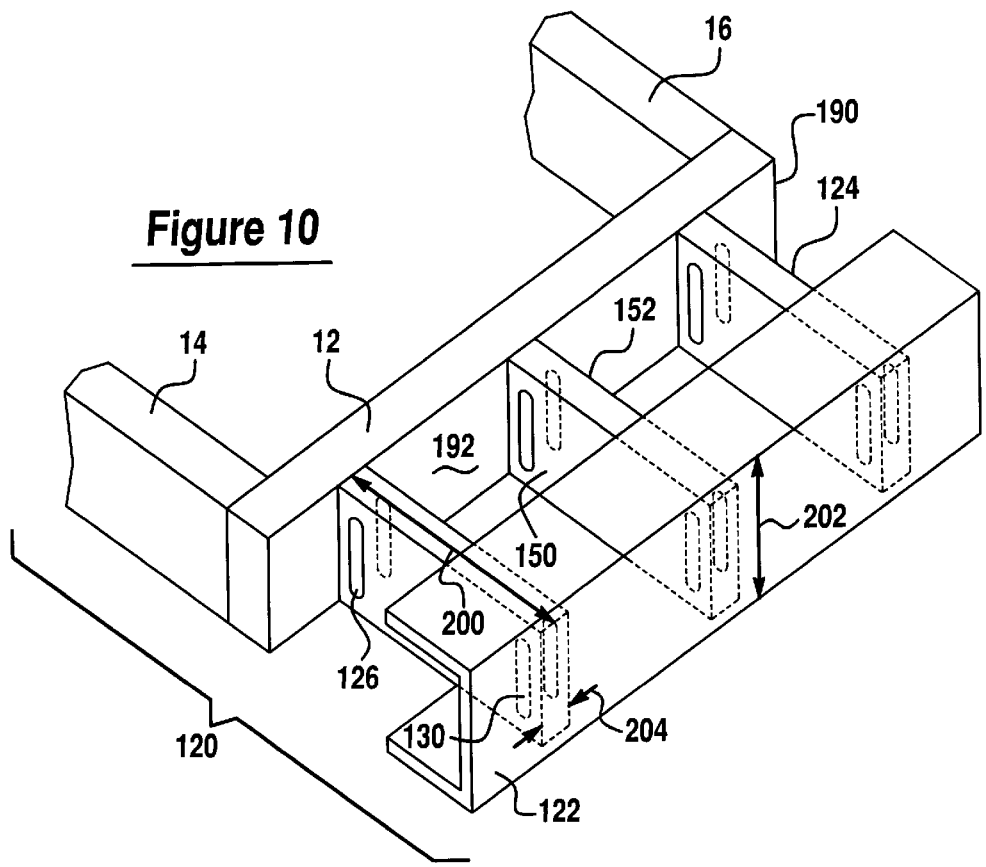
FIG. 10 is a front perspective view of a vehicle bumper made in accordance with a fourth embodiment of the present invention.
Figure 11:
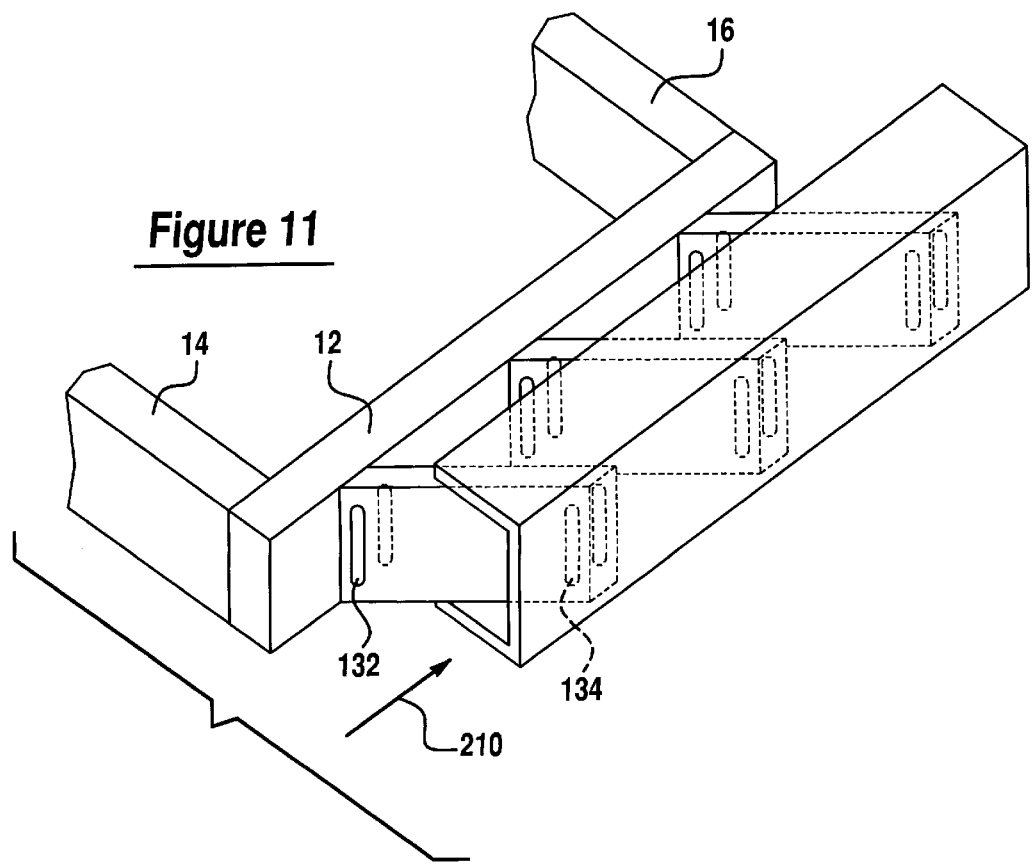
FIG. 11 is a front perspective view of a vehicle bumper made in accordance with a fourth embodiment of the present invention and which has been involved in an offset collision.

During an "offset" type collision, tabs 82 are designed to be easily sheared or broken, along stem 110, thereby allowing transverse type movement of bumper cover 84 and material 99 in the manner previously described. Using the dimensions illustrated in FIG. 9 and described above, tabs 82 will shear upon an transverse load 113 of about 1000 pounds Referring to FIGS. 10 and 11 there is shown a vehicle bumper and side rail assembly 120 made in accordance with the teachings of a fourth embodiment of the invention. The components of vehicle bumper 120 shown in FIGS. 10 and 11 are substantially similar in function and structure to those of bumper 10, wherein like reference numerals denote substantially similar components.

In this alternate embodiment, a bumper cover 122 is utilized, bumper cover 122 being substantially identical to cover 84, with the exception that tabs 82 are not utilized. Vehicle bumper 120 also includes a tubular rectangular shaped bumper reinforcement beam 190 which may be substantially similar to beam 12.

Particularly, in this embodiment, a plurality of substantially identical members 124, each having a generally rectangular cross sectional area are attached by conventional means (e.g. by welding) within channel 85 of member 122 and to surface 192 of member 190. Moreover, each member 124 contains opposed divots or portions 126 at each end of each of the respective surfaces 150, 152. In the preferred embodiment of this invention, the length 200 of each member 124 is about ten inches, the height 202 is about seven inches, and the thickness 204 is about four inches. Members 124 are made of commercially available steel, aluminum or plastic. In the preferred embodiment of the invention about three equally spaced members 124 are utilized and each of the divot portions 126 are substantially identical and generally elliptical in shape, having a uniform depth of about one inch and a distance between the elliptical loci of about five inches.

In an "offset" type collision, the divots 126 allow each of the members 124 to easily move transverse or generally perpendicular relative to the longitudinal axis of symmetry of the vehicle. This is due to the fact that these divots 126 selectively weaken the structural integrity of each of the members 124 to a transverse type force, such as force 210 thereby allowing the previously described movement necessary to reduce the force of these "offset" type collisions.

It should be understood that this invention is not limited to the exact construction or embodiments listed and described but that various changes may be made without departing from the spirit and scope of the invention.

What is claimed is:

1. A bumper assembly for use in combination with a vehicle of the type having a bumper reinforcement beam, said bumper assembly comprising:

a flexible bumper cover attached to said reinforcement beam;

a layer of energy absorbing foam residing between said bumper cover and said reinforcement beam; and a material abutting said reinforcement beam and residing between said energy absorbing foam and said reinforcement beam and being adapted to allow said foam and said flexible bumper cover to move longitudinally along said reinforcement beam when said vehicle is involved in an offset collision.

2. The bumper assembly of claim 1 wherein said material has a relatively low coefficient of friction.

3. The bumper assembly of claim 1 wherein said material comprises a coating of oil applied to said absorbing foam.

4. The bumper assembly of claim 1 wherein said material is longitudinally coextensive to said beam.

5. The bumper assembly of claim 4 wherein said material substantially covers one surface of said beam.

* * * * *